No. 716,489. Patented Dec. 23, 1902.
J. SLATER.
MEANS FOR ATTACHING CAPS TO FOUNTAIN OR OTHER PENS, &c.
(Application filed Sept. 15, 1902.)
(No Model.)
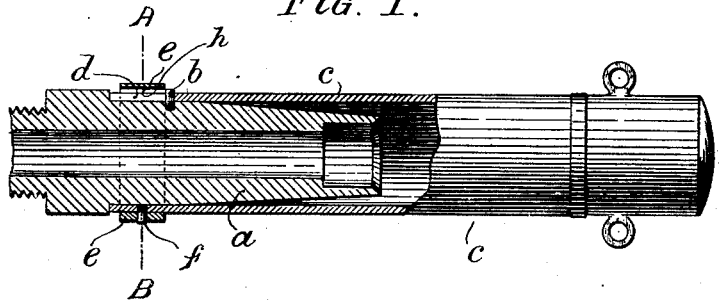
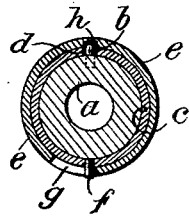
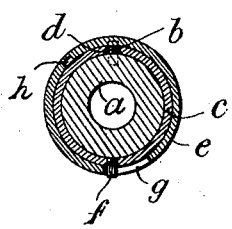
WITNESSES:
INVENTOR:

UNITED STATES PATENT OFFICE.

JOHN SLATER, OF EAST HAM, ENGLAND, ASSIGNOR TO MABIE TODD AND BARD, OF NEW YORK, N. Y.

MEANS FOR ATTACHING CAPS TO FOUNTAIN OR OTHER PENS, &c.

SPECIFICATION forming part of Letters Patent No. 716,489, dated December 23, 1902.

Application filed September 15, 1902. Serial No. 123,553. (No model.)

*To all whom it may concern:*

Be it known that I, JOHN SLATER, mechanic, of 23 Milton avenue, East Ham, county of Essex, England, have invented certain new and useful improvements in means for attaching caps to fountain or other pens or to pencils or the like or for attaching other sections or parts together, of which the following is a specification.

This invention has reference to means for attaching caps to fountain and other pens or to pencils or the like or for attaching other sections or parts together. It has been more particularly designed for attaching caps to fountain-pens adapted to be suspended from a chatelaine, waist-belt, or other article of dress; but, as will be well understood, it can be employed with advantage for attaching point-guards to pencils or generally for connecting a tubular or partly tubular section to any part or section to which it may be desired to attach the same.

I will describe the invention as applied to a fountain-pen of the suspended type, and its application to other articles will then be readily understood.

With fountain-pens of the kind in question it is usual to suspend the cap by means of a chain or other attachment to the dress and to connect the pen to the cap by means of a bayonet or other simple joint. It has been found in use that the pen is liable to become detached and lost, owing to carelessness in inserting it in the cap after use or from other cause. By my invention this disadvantage is overcome and the cap and holder are securely locked together, while being adapted to be readily disconnected when desired.

According to this invention in one form thereof I provide the pen-section at a suitable point with a pin, and I form the lower edge of the cap with a longitudinal slot adapted to give passage to said pin when the cap is placed over the pen. Upon the lower end of the cap I mount a band or collar, which is free to be turned around or backward and forward on the cap in order to lock or release the said pin, as hereinafter described. The inner face of this band or collar is formed with a groove or recess extending longitudinally of the pen-barrel and of sufficient depth to allow the pin to travel therein when the parts are to be connected or disconnected, while the collar has a rotary motion which serves to move the groove out of alinement with the pin and lock the parts firmly together, with the pin at the inner end of the slot in the cap. The collar may be attached to the cap in any convenient way. A transverse slot of suitable length may also be formed in the wall of the collar. A pin on the cap works in this slot, the ends of the slot acting as stops to this pin and limiting the turning motion of the collar in either direction. The length of the transverse slot is preferably such that when the collar is turned in the one direction until the pin on the cap strikes one end of its slot the internal groove of the collar coincides with the longitudinal slot in the cap, and the pin on the pen-section can be passed into or out of said slot. On the other hand, by turning the collar in the other direction the groove and slot are moved out of coincidence, and the collar serves to securely lock the pin on the pen-section in the slot of the cap.

The accompanying drawings illustrate a pen-section and cap constructed and adapted to be locked together as above described.

In the drawings, Figure 1 is a central longitudinal section through the pen-section and cap, the nib and ink-feeding members being omitted for the sake of simplicity. The pen-section is shown as inserted in the cap, with the locking-collar in the position in which its groove gives passage to the pin on the pen-section. Fig. 2 is a transverse section on line A B of Fig. 1. Fig. 3 is a corresponding section to Fig. 2, but showing the locking-collar turned to lock the pen-section and cap together.

*a* is the pen-section, adapted to be screwed, as usual, into the reservoir or holder of the pen. (Not shown.) *b* is the pin carried thereby, as above described.

*c* is the cap, and *d* the longitudinal slot therein adapted to give passage to the pin *b* when the pen-section is inserted in the cap.

*e* is the locking-collar, mounted on the cap *c* and free to turn thereon with a suitable degree of friction to prevent its slipping around accidentally. The motion of the collar *e* is limited by the pin $f$ on the cap working in the transverse slot $g$ of the collar. The inner face of the collar is formed with a longitudinal groove $h$—i. e., longitudinal with reference to the pen-section or barrel and cap—adapted to be brought into coincidence with the slot $d$ by turning the collar $e$, this groove $h$ being of sufficient depth to permit the pin $b$ to pass through same to the rear of the collar $e$ or to be withdrawn, as required. The length of the slot $g$ is such that when the collar $e$ is turned in the one direction until the pin $f$ strikes one end of this slot the groove $h$ coincides with the slot $d$, and the pin $b$ can pass through said slot and groove to enable the pen-section to be introduced into or removed from the cap. When the pen-section has thus been introduced into the cap, the collar is turned in the opposite direction, whereby the groove $h$ and slot $d$ are moved out of coincidence, and the collar securely locks the pin $b$ of the pen-section at the end of the slot $d$ of the cap.

What I claim, and desire to secure by Letters Patent, is—

1. Means for attaching caps to fountain and other pens, or to pencils, or for securing tubular or partly tubular sections or parts to other parts or members, comprising the combination of a pin on the one part to be connected, a longitudinal slot in the other part and a collar having a longitudinal recess therein adapted by turning said collar to be brought into and out of coincidence with said slot, whereby when said slot and recess are in coincidence said pin can be passed therethrough, and when said collar is turned to move said slot and recess out of coincidence, said pin can be locked in said slot by said collar, substantially as described.

2. Means for attaching caps to fountain and other pens, or to pencils, or for securing tubular or partly tubular sections or parts to other parts or members, comprising the combination of a pin on the one part to be connected, a longitudinal slot in the other part, a collar on said last-mentioned part having a longitudinal recess adapted, by turning said collar, to be brought into and out of coincidence with said slot, whereby when said slot and recess are in coincidence said pin can be passed therethrough, and when said collar is turned to move said slot and recess out of coincidence the pin can be locked in said slot by said collar, and a pin-and-slot connection between said collar and the part on which it is mounted, and serving to limit the turning motion of said collar, substantially as described.

3. Means for attaching caps to fountain and other pens, or to pencils, or for securing tubular or partly tubular sections or parts to other parts or members, comprising the combination of a pin on the one part to be connected and a longitudinal slot in the other part, a collar on said last-mentioned part having a longitudinal recess adapted, by turning said collar, to be brought into and out of coincidence with said slot, whereby when said slot and recess are in coincidence said pin can be passed therethrough and when said collar is turned to move said slot and recess out of coincidence the pin can be locked in said slot by said collar, and a pin-and-slot connection between said collar and the part on which it is mounted and serving to limit the turning motion of said collar, the relative arrangement of said pin-and-slot connection and said first-mentioned slot being such that when the pin of the pin-and-slot connection is in its one extreme position said longitudinal slot coincides with the recess in the collar, substantially as described.

In witness whereof I have hereunto signed my name in the presence of two subscribing witnesses.

JOHN SLATER.

Witnesses:
ANDREW C. WATTS,
THOMAS L. WHITEHEAD.